358-74. XR 2,535,530 SR

X6544

Dec. 26, 1950 E. L. CLARK ET AL 2,535,530

HIGH-VOLTAGE SUPPLY FOR CATHODE-RAY TUBES

Filed Jan. 9, 1947

INVENTORS
EDWIN L. CLARK
ANTONY WRIGHT

BY H. S. Grover

ATTORNEY

Patented Dec. 26, 1950 2,535,530

UNITED STATES PATENT OFFICE 2,535,530

HIGH-VOLTAGE SUPPLY FOR CATHODE-RAY TUBES

Edwin L. Clark, Collingswood, N. J., and Antony Wright, Drexel Park Gardens, Pa., assignors to Radio Corporation of America, a corporation of Delaware Application January 9, 1947, Serial No. 721,010

6 Claims. (Cl. 178—5.4)

Figure 1:
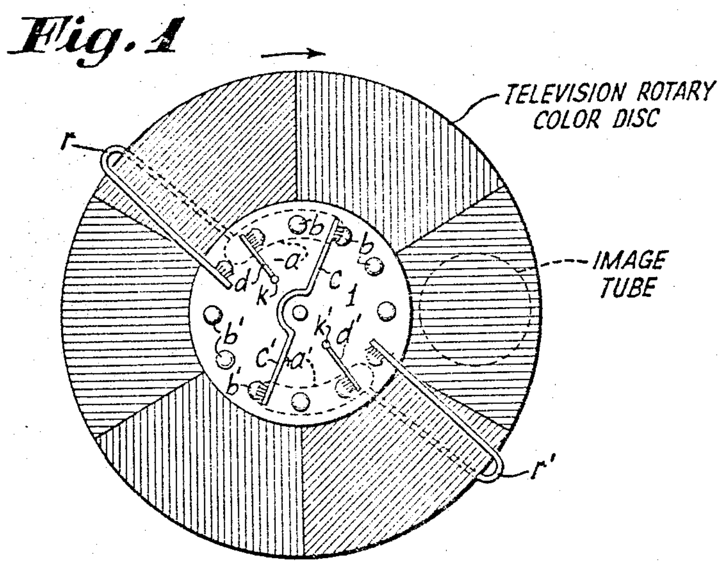

This invention relates to television systems and more particularly to an electrostatic generator operating in conjunction with a rotary color filter for providing a high voltage supply for the associated cathode ray image producing tube.

The transmission of television images is accomplished by analyzing the scene into its elemental areas, which are selected from the complete image or picture area in the orderly sequence of scanning, and transmitting signals one after the other to represent the said areas. Since the scanning and image repetition processes are essentially artificial ones, it is possible to choose arbitrarily the scanning pattern, so long as the same scanning pattern is used at the receiver as that employed at the transmitter.

The reproduction of television images in substantially their natural color can be accomplished by a tricolor system, for instance, by resorting to additive methods through transmitting sequentially signals representative of each of three selected primary or component colors. These selected primary or component colors are usually red, blue and green, taken in any appropriate order. The image is reproduced in substantially natural color by a scanning operation similar to that scanning operation which occurs at the transmitting station.

As is well known in the art, this transmission of images in substantially their natural color can be accomplished by the use of mobile color filters of the three selected primary or component colors which are used for color separation and positioned in the optical path of the transmitting camera tube and controlling a like set of filters in front of the image reproducing tube.

Mobile color filters may take any of a number of well known forms. The disk type rotary color filter may be, for example, of the type shown on page 146 of "RCA Review" for June, 1946, volume 2, No. 2, in an article entitled "An Experimental Color Television System," by R. D. Kell, G. L. Fredenall, A. C. Schroeder, and R. C. Webb.

A drum type color filter suitable for use in the employment of this invention in one of its preferred forms may be, for example, of the improved type shown and described in the U. S. Patent No. 2,458,649, issued to Otto H. Schade on January 11, 1949.

It has been known since the time of the ancients that static electricity can be produced by friction.

The essential idea involved in most machines for producing electrostatic charges can best be understood by study of the device known as the electrophorus. It consists of a hard rubber disk mounted on a metal plate which is in contact with the ground. A second metal disk of the same size is fitted with a hard rubber handled brush which can be raised or lowered over the rubber plate. The latter is then "excited" by rubbing it with cat's fur and acquires a negative charge on its upper surface while the lower layers act like the dielectric of the condenser. This results in an induced positive charge on the upper surface of the supporting metal plate. A movable plate is then lowered into contact with the rubber disk and thus acquires induced positive and negative charges on its lower and upper surfaces respectively. This does not appreciably remove the negative electricity from the rubber, because in reality the contact is made only at a few points, and even if these are desirable, there is no flow over this non-conducting surface to carry off the entire charge. The next step is to ground the movable plate, which is most effectively done by connecting it to the lower positive charge of the system. This leaves the two middle charges in close contact and at zero potential with respect to the earth. If the upper plate is now lifted by the handle, its potential is raised while its positive charge is progressively removed from the influence of the negative field. When a foot or so away, the charge on the metal disk has a potential sufficiently above the earth to discharge a spark an inch or more long to the hand held near it. Meanwhile the rubber disk has fallen in potential to a point as far below zero as the plate was above it, and causes a positive charge to flow from the earth into the lower plate. The whole process may now be repeated and a succession of sparks may thus be drawn from the movable plate without any marked diminution in the original charge. This seems like getting something for nothing, but it involves each time the plate is lifted an expenditure of energy to separate the charges against their mutual attraction. This work is in excess of that done against gravity, and the energy of the spark at each discharge represents this excess.

It is perhaps of interest to note that the principle of electrostatic induction generators has been recently employed for the generation of high potential D.-C. sources to be used in nuclear disintegration experiments. A device of this nature was designed and developed by R. J. Van der Graff to achieve potential differences up to $10^7$ volts.

The Van der Graff machine is shown and described in the "Physical Review" of February 1, 1933, by R. J. Van der Graff, K. T. Compton, and L. C. Van Atta.

The employment of electrostatic induction generators as applied to the practice of this invention does not require such extremely high potential differences. The high potential required is only that necessary to supply the high voltage anode of a cathode ray tube employed in the reproduction of television images. This is in the order of between 7 kilovolts and 12 kilovolts, except in the case of the projection tube wherein a supply in the range of between 30 and 50 kilovolts is required.

Heretofore television high voltage supplies have been provided by an auxiliary high voltage power supply, preferably of either the rectified radio frequency or the so-called "surge" or pulse voltage type. A typical radio-frequency operated high voltage supply is shown and described by O. H. Schade in an article entitled "Radio-Frequency Operated High Voltage Supplies for Cathode Ray Tubes," published by the Harrison Engineering Department, RCA Victor Division of the Radio Corporation of America, in Publication No. ST-235 and dated April, 1943. An example of the so-called surge of pulse type system is found in the presently marketed RCA television receiver, Model 630-TS.

According to this invention, a simplified and improved high voltage supply for cathode ray tubes used in conjunction with rotary color filters is provided by employing an insulated rotary support member of the rotary component color filter element as the rotating portion of a simple electrostatic induction generator, and deriving therefrom static electricity charges filtered in an appropriate filter system and applied to the high voltage anode of the associated cathode ray tube.

A primary object of this invention is to provide a simple and inexpensive high voltage supply for cathode ray tubes employed in the reproduction of substantially natural color images.

Figure 2:
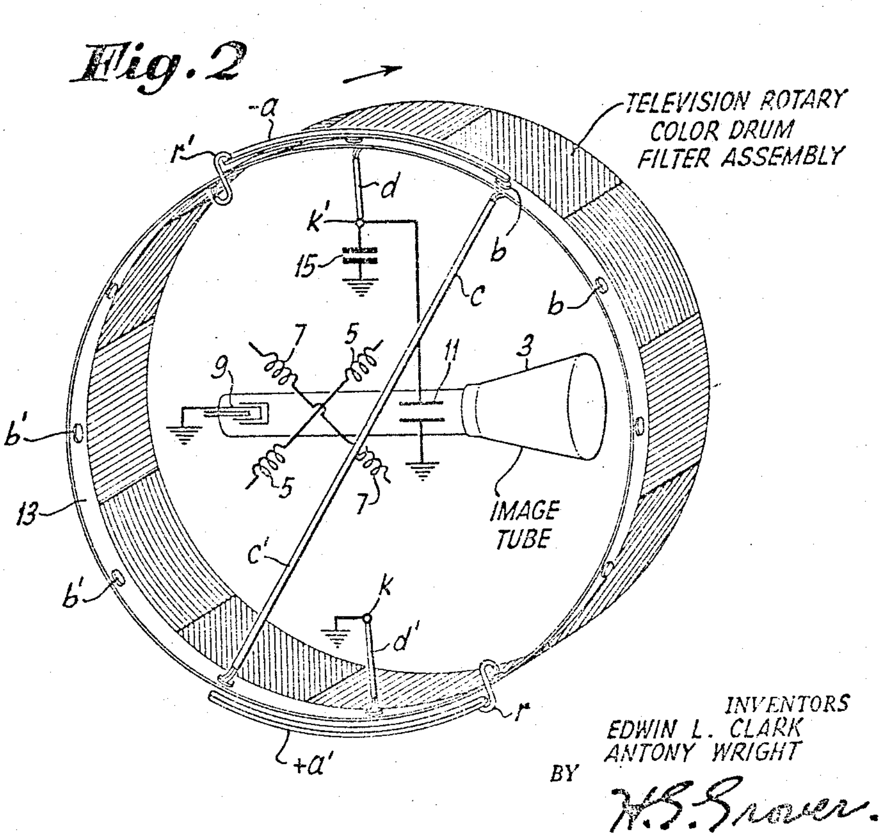

Other and incidental objects of the invention will be apparent to those skilled in the art from a reading of the following specification and an inspection of the accompanying drawing in which:

Figure 1 illustrates schematically one preferred form of this invention wherein a disk type rotary color filter is employed; and Figure 2 illustrates schematically another preferred form of this invention employing a drum type color filter.

Turning now in more detail to Figure 1, there is illustrated a television rotary component color filter disk of the type referred to above in the article entitled "An Experimental Color Television System," beginning on page 141 of "RCA Review" for June, 1946, and having a plurality of different component color sections, as illustrated. It will be understood that this invention is not limited to the employment of the type of sequence of the component color illustrated, but is applicable to any system employing a mechanically rotating member in connection with the requirement of a high voltage potential.

The operation of an electrostatic generator will be understood from a description of the generator illustrated in conjunction with the color disk shown in Figure 1.

The television rotary color disk contains an electrical insulating support member 1 which forms a part of the associated "influence machine" for generating the required high voltage.

The Toeler-Holtz is probably the most common form of influence machine and can be built to give intense sparks a foot long under all but the worst atmospheric conditions. It consists of two disks usually of glass, one fixed, while the other, parallel to it and separated by about a centimeter, is made to revolve on a shaft. On the back of the fixed plate are two "inductors" *aa'*, made of conducting material and indicated by dotted lines in Figure 1. These act through the glass inductively on metal buttons *bb'* mounted on the outside of the revolving disk shown nearest the observer. When given a small initial charge, say negative, *a* induces two charges on the nearest button *b* exactly as the rubber disk acts upon the moveable plate of the electrophorus. As button *b* is about to leave the field of the inductor *a*, a brush attached to *cc'*, the neutralizing rod, carries off the electrical charge which just balances a similar but unlike one from button *b'* diametrically opposite. Still further separation from *a* causes the potential of button *b* to rise to a point where it can discharge positive electricity by contact with the replenished brush *r*. This carries off a small portion of the button's charge to the positive inductor *a'*. Finally when the button reaches position *d'*, it is completely discharged by the point on the collecting comb which carries the electricity to the discharge knobs *kk'*. The points of the comb really act to form a highly concentrated induced charge of opposite sign which flows across the air gap, neutralizing the charge on the button and so leaving the knob *k'* charged with positive electricity like the button. The same process goes on in the lower half of the disk. The inductor *a* has been replenished, or built up, and the left hand comb has discharged a positive electricity to neutralize the charge on the button *b'*, leaving its knob negatively charged.

In accordance with a preferred form of this invention, the positive electrical charge thus derived on the knob *k'* is transferred to and stored in the condensers which also have a filtering action. An electrical connection is then provided between the high voltage element of the associated cathode ray tube (not shown by Figure 1), and the knob *k'*. Knob *k* is grounded. The electrostatic generator employed in connection with the rotary color disk illustrated in Figure 1 may, of course, take various other forms. The electrostatic elements may, for example, be positioned in some insulating member carried on the exterior edge of the rotary color disk.

Turning now to Figure 2, there is illustrated a cathode ray tube 3 having associated deflection coils 5 and 7 (the circuits of these elements are not shown since any well known form may be used), together with electron gun 9 employed for the generation of the necessary cathode ray beam. The cathode ray tube 3 may, for example, take the form of a kinescope which is very well shown and described in an article by Dr. V. K. Zworykin entitled "Description of an Experimental Television System and Kinescope" contained in the "Proceedings of the Institute of Radio Engineers," volume 21, No. 12, for December, 1933.

In order to produce the desired cathode ray beam in tube 3, it is necessary to provide high voltage element 11 with a relatively high voltage of the order of 7 to 10 kilovolts.

By adding an insulating member 13 to the rotary color disk, an electrostatic generator of the type shown and described above, but having a different form factor, may be provided to furnish the high voltage required for element 11 of tube 3.

The electric charge is removed by the collector combs *d* and *d'*, as explained in connection with Figure 1. A storage condenser 15 provides storage and filter action. The storage condenser 15 is connected to the high voltage element 11 of the tube 3. During operation, the necessary high voltage potential is applied to the element 11.

Having thus described the invention, what is claimed is:

1. In a color image television system, a cathode ray tube having an image screen and an element adapted to receive a high voltage potential, a rotary color filter having a plurality of different selected component color filter elements, said color filter elements arranged to traverse said cathode ray tube screen in a predetermined sequential manner, said color filter having a rotary support element, said rotary support element comprising the rotatable member of an electrostatic generator, and the output terminal of said generator connected to said element in said cathode ray tube adapted to receive a high voltage potential.

2. In a color image television system, a cathode ray tube having an image screen and an element adapted to receive a high voltage potential, a disk color filter having a plurality of different selected component color filter elements, said color filter positioned adjacent to and operatively associated with said cathode ray tube screen, said color filter having a rotary support element, said rotary support element comprising the rotatable member of an electrostatic generator, and the output terminal of said generator connected to said element in said cathode ray tube adapted to receive a high voltage potential.

3. In a color image television system, a cathode ray tube having an image screen and an element adapted to receive a high voltage potential, a drum color filter having a plurality of different selected component color filter elements, said color filter elements arranged to traverse said cathode ray tube screen in a predetermined sequential manner, said color filter having a rotary support element, said rotary support element comprising the rotatable member of an electrostatic generator, and the output terminal of said generator connected to said element in said cathode ray tube adapted to receive a high voltage potential.

4. In a color image television system, a cathode ray tube having an image screen and an element adapted to receive a high voltage potential, a rotary color filter having a plurality of different selected component color filter elements, said color filter elements arranged to traverse said cathode ray tube screen in a predetermined sequential manner, said color filter having a rotary support element, said rotary support element comprising an insulating material supporting metallic elements adapted to receive an electrostatic charge by induction, means for gathering said charge, and said charge gathering means connected to said element of said cathode ray tube adapted to receive said high voltage potential.

5. In a color image television system, a cathode ray tube having an image screen and an element adapted to receive a high voltage potential, a rotary color filter having a plurality of different selected component color filter elements, said color filter elements arranged to traverse said cathode ray tube screen in a predetermined sequential manner, said color filter having a rotary support element, said rotary support element having an insert comprising an insulating material supporting metallic buttons adapted to receive an electrostatic charge by induction, means for gathering said charge, and said charge gathering means connected to said element of said cathode ray tube adapted to receive said high voltage potential.

6. A sequential type color television receiver having a cathode ray tube, including an image screen, a series of different component color filters moveably positioned adjacent said screen, a rotatable support for said filters, said rotatable support being of an electrical insulation material and supporting along a fixed radius a series of conductive elements, a plurality of conductive inductors positioned adjacent to said series of conducting elements to act inductively on said conductive inductors, a neutralizing rod positioned opposite said inductors to remove electrical charges from said conductive elements, a brush connected to said conductors and positioned adjacent to the path of said conductive elements, a collecting comb also positioned adjacent to the path of said conductive elements to collect electrical charge, and an electrical connection between said collecting comb and said cathode ray tube for utilization of the induced charge.

EDWIN L. CLARK.
ANTONY WRIGHT.

REFERENCES CITED

The following references are of record in the file of this patent:

UNITED STATES PATENTS

| Number | Name | Date |
|---|---|---|
| 1,011,939 | Ghilarducci | Dec. 19, 1911 |
| 2,317,989 | Goldmark | May 4, 1943 |
| 2,319,789 | Chambers | May 25, 1943 |
| 2,378,746 | Beers | June 19, 1945 |